Feb. 2, 1943.  A. P. FERGUESON  2,309,636
BRAKE LEVER
Filed May 9, 1940  3 Sheets-Sheet 1
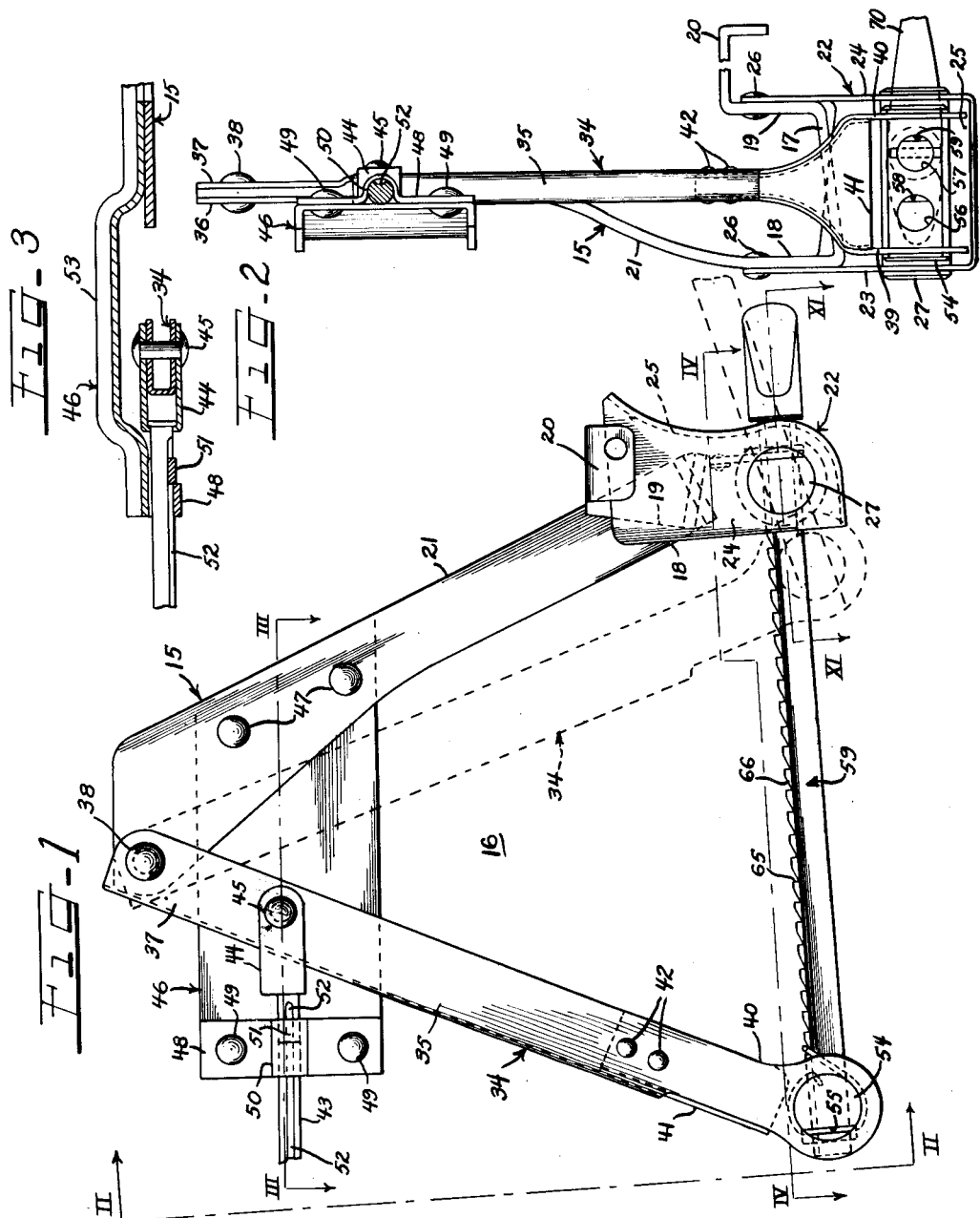
Inventor
Arthur P. Fergueson Feb. 2, 1943. A. P. FERGUESON 2,309,636
BRAKE LEVER
Filed May 9, 1940 3 Sheets-Sheet 2
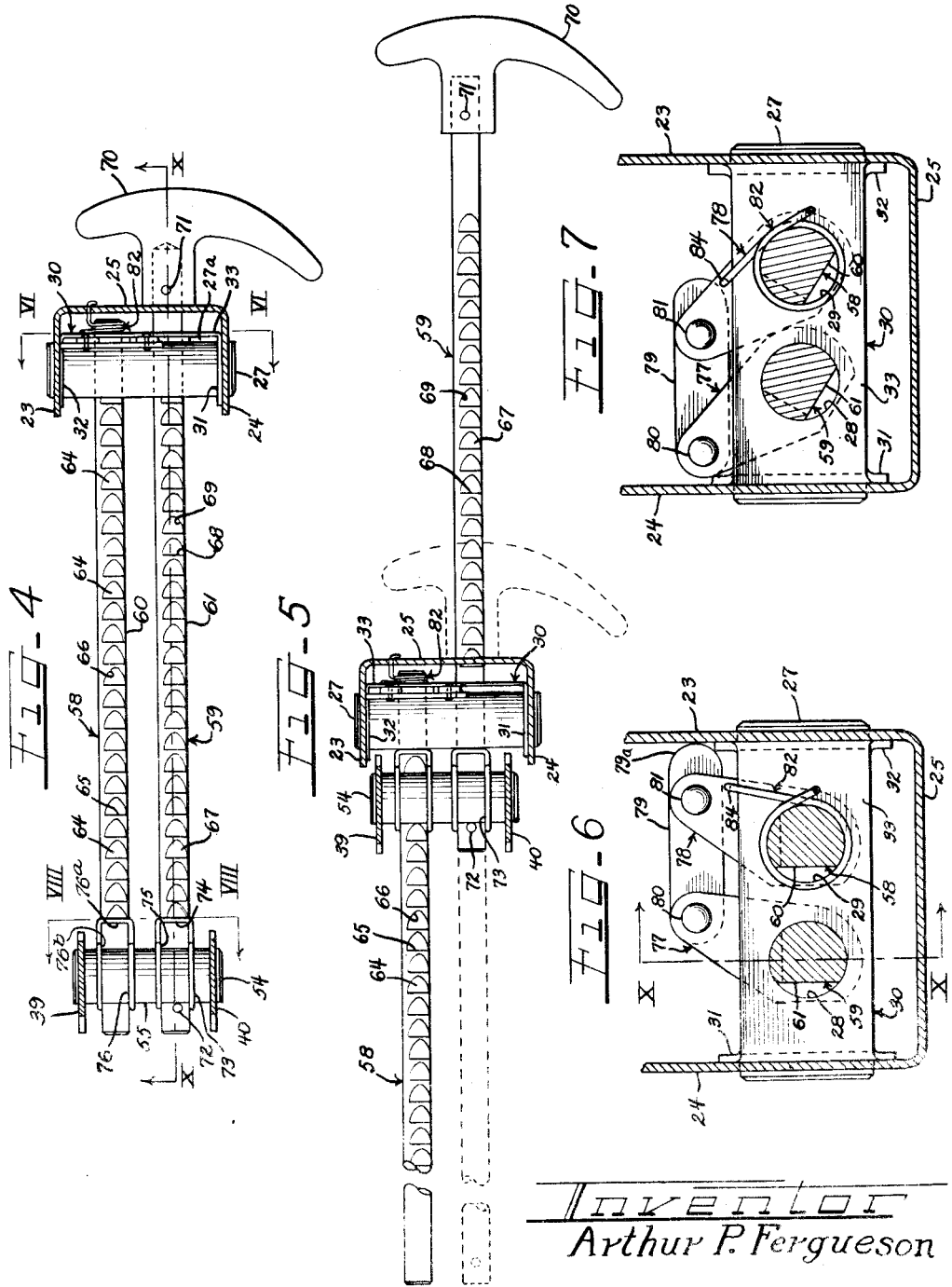
Inventor
Arthur P. Fergueson Feb. 2, 1943. A. P. FERGUESON 2,309,636
BRAKE LEVER
Filed May 9, 1940 3 Sheets-Sheet 3
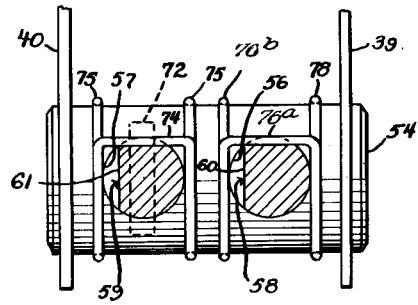
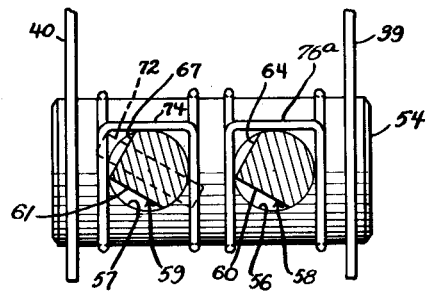
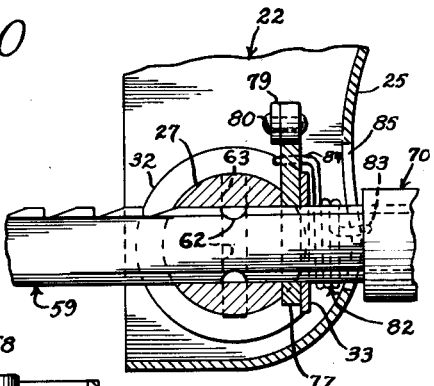
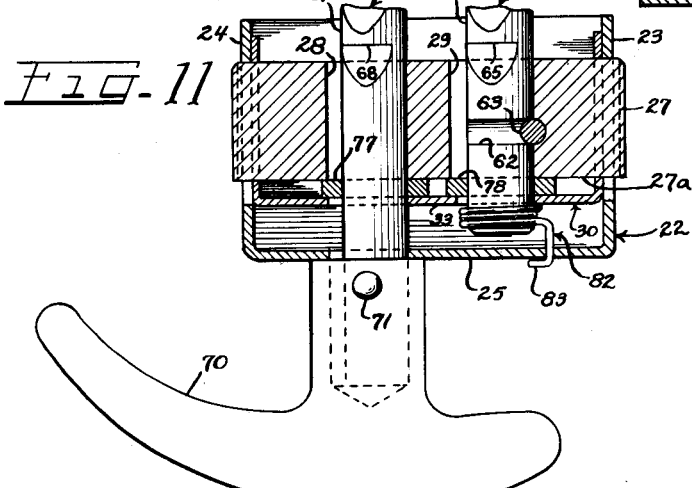
Inventor
Arthur P. Fergueson
by Charles H. Hill Attys Patented Feb. 2, 1943

2,309,636

UNITED STATES PATENT OFFICE 2,309,636

BRAKE LEVER

Arthur P. Fergueson, Detroit, Mich., assignor to Houdaille-Hershey Corporation, Detroit, Mich., a corporation of Michigan Application May 9, 1940, Serial No. 334,103

18 Claims. (Cl. 74—536)

This invention relates to a novel brake lever construction and more particularly to an improved brake-operating device whereby the brakes of an automotive vehicle are set and released by a substantially endwise movable actuating member which is held and released from an adjusted position by rotative movement.

An important object of this invention is the provision of a brake lever construction in which a straight-pull type of lever arrangement is adapted to a swinging type of lever.

Another object of this invention is to provide a brake lever construction having brake applying mechanism with an actuating member movable in substantially an endwise direction for applying and releasing brakes and movable in a rotative direction for releasing the brake applying mechanism from its adjusted holding position.

A further object of this invention is the provision of a combination straight-pull and swinging type of brake lever construction wherein the swinging brake applying member is held in adjusted position by the cooperation of a pawl and ratchet independently of the straight-pull actuating member.

A further object of this invention is to provide a combination straight-pull and swinging type of brake lever construction having an actuating member arranged to swing a lever member by complete or partial endwise movements.

A still further object of this invention is to provide a straight-pull and swinging type of brake lever construction having an endwise movable member for swinging a brake actuating lever from a brake released position to a brake actuating position by a complete movement or by partial endwise movements, with the endwise movable member being arranged for return to its original brake-released position independent of the position of the swinging lever.

Another and still further object of this invention is the provision of a swingable member having operative connection with a pair of parallel members, one of which is axially movable relative to the other and each of which is provided with a clutching member, one of the clutching members engaging the axially movable member to effect swinging movement of the swingable member and the other clutching member engaging the stationary parallel member to hold the swingable member in its adjusted swung position.

A further object of this invention is the provision of a combination straight-pull and swinging type of lever construction having an endwise movable member for moving a swingable brake actuating member, latching means adjacent the endwise movable member for holding the swingable member in adjusted position, and a novel release mechanism operable by rotation of the endwise movable member for release of the swingable member from its adjusted position.

A still further object of the present invention is to provide a brake operating means which is simple in construction, durable and efficient in use, and which may be readily applied in place.

The novel features believed to be characteristic of the present invention are set forth with particularity in the appended claims. The invention itself, however, both as to its organization and manner of construction, together with further objects and advantages thereof, may best be understood by reference to the following description taken in connection with the accompanying drawings, in which:

Figure 1 is a side elevational view of a brake lever mechanism constructed in accordance with the principles of the present invention and diagrammatically illustrating, in dotted lines, the relative position of parts when the actuating member is moved from a brake-released position to a brake-actuated position;

Figure 2 is an edge elevational view, as seen from the left, of the brake lever mechanism illustrated in Figure 1;

Figure 3 is a transverse cross-sectional view, with parts in elevation, taken substantially in the plane indicated by the line III—III of Figure 1;

Figure 4 is a top plan view, with parts in transverse cross-section, taken substantially in the plane indicated by the line IV—IV of Figure 1;

Figure 5 is a view similar to Figure 4 illustrating, in full lines, the relative position of parts when the brakes have been fully actuated by one complete endwise movement of the actuating member and, in dotted lines, the position of the actuating member when moved to its original position without affecting the adjusted position of the swingable lever;

Figure 6 is an enlarged horizontal end view, with parts in elevation and other parts in cross-section, taken substantially in the plane indicated by the line VI—VI of Figure 4 and looking in the direction of the arrows;

Figure 7 is a view similar to Figure 6 illustrating the rotational limits of the ratchet members shown in Figure 4;

Figure 8 is an enlarged horizontal view, with parts in vertical cross-section, taken substantially in the plane indicated by the line VIII—VIII of Figure 4;

Figure 9 is a view similar to Figure 8 illustrating the position of the ratchet members when rotated to the position as shown in Figure 7;

Figure 10 is an enlarged fragmental broken longitudinal cross-section, with parts in elevation, taken substantially in the plane indicated by the line X—X of Figure 4; and Figure 11 is an enlarged fragmental longitudinal cross-sectional view, with parts in elevation, taken substantially in the plane indicated by the line XI—XI of Figure 1 and looking in the direction of the arrows.

The brake lever construction herein illustrated is a straight-pull type of lever arrangement adapted to the swinging type of lever. It is similar to the so-called "dash" type in that it is adapted to be pivoted behind the instrument board of an automotive vehicle, with the actuating grip portion projecting below and beyond the instrument board.

As particularly illustrated in Figure 1, one form of the invention is disclosed which includes a mounting plate or bracket 15 of flat metal stamped to proper size and form for pivotally supporting the brake lever assembly 16. The upper end of the supporting bracket 15 is attached in a suitable manner to the dash or a body portion of the vehicle. At the lower end of the bracket 15, there is provided a U-shaped portion 17 having angularly offset upstanding legs 18 and 19, the latter terminating in a horizontally extending inverted U-shaped flange 20. The laterally extending flange 20 is supported by and connected to the inturned flange of the instrument panel (not shown). The intermediate portion 21 of the mounting bracket connecting its upper end and its lower leg 18 is curved as shown in Figure 2, to align the upper end of the mounting bracket centrally of the U-shaped end 17.

As thus shown in Figures 1 and 2, a box-like bracket 22, having side walls 23 and 24 and a web 25, straddles and is connected to the U-shaped end 17 of the bracket by means of rivets 26.

The side walls 23 and 24 are suitably apertured to receive therethrough, in pivotal relation, a D-shaped trunnion 27 having a flat longitudinally extending side face 27a (Figure 11). As shown in Figures 6 and 7, the trunnion 27 is provided with a pair of spaced transversely extending apertures 28 and 29 for a purpose to be more fully explained hereinafter.

A U-shaped strap (Figures 4 to 7) is provided with end legs 31 and 32 and a connecting web 33. The legs 31 and 32 are suitably apertured to receive therethrough, in press-fit relation, the trunnion 27. When assembled, in the relation as shown in Figures 6 and 7, the U-shaped strap 30 holds the trunnion from moving in an endwise direction while the ends of the trunnion pivot in the side walls of the box-like bracket 22.

A swingable lever member 34, having a body portion 35 of U-shaped configuration, is provided at its upper end with spaced parallel legs 36 and 37 which closely straddle the upper end of the bracket 15 to which it is pivotally connected by means of a pin or rivet 38. The side walls at the lower end of the swinging lever 35 extend downwardly in outwardly offset relation to provide spaced parallel legs 39 and 40 which form a bifurcated or forked leg structure. A reinforcing plate 41 of tapered U-shaped configuration is inserted between the upper portion of the legs 39 and 40 and is held in connected position to the side walls of the U-shaped body portion 35 of the lever by means of rivets 42.

The braking mechanism of the vehicle (not shown) may be suitably connected to the swingable lever 34 by means of an actuating rod 43 and a clevis 44 which straddles the swingable lever and is connected to its side walls by means of a bolt or rivet 45. Movement of the swingable lever about its pivot 38 actuates the braking mechanism by movement of the brake rod 43. A guiding mechanism is provided to allow the actuating rod 43 to be reciprocated in a single plane while at the same time preventing any rotational movement thereof.

As shown in Figures 1, 2 and 3, a channel-shaped bracket 46 is connected at one end, as by rivets 47 or other similar means, to the bracket 15 in such angular relationship that its longitudinal axis is parallel with the axis of the reciprocating rod 43. A U-shaped bracket or strap 48 is connected to the other end of the channel-shaped bracket 46 by means of rivets 49. The central U-shaped portion 50 of the strap embraces the reciprocating rod 43 for the purpose of axially guiding the rod during reciprocating movement. A part of the U-shaped portion of the strap is bulged inwardly to form a lug 51 which seats within the longitudinal slot 52 provided in the reciprocating rod 43 to prevent rotational movement thereof.

As shown in Figure 3, a central portion 53 of the channel-shaped bracket 46 is offset outwardly to define swinging clearance for the swingable lever 34 and the clevis 44 which connects the lever to the brake actuating mechanism.

The lower legs 39 and 40 of the swingable lever 34 are suitably apertured to pivotally receive therethrough a second trunnion 54. The trunnion 54 is also D-shaped in cross-section and provides a flat longitudinally extending surface 55 for a purpose to be more fully explained hereinafter. Transversely extending apertures 56 and 57 (Figures 2, 8 and 9) are provided in the trunnion 54 in the same spaced relation as the similar apertures provided in the trunnion 27.

A pair of D-shaped latching rods 58 and 59 are inserted through the pairs of transverse apertures provided in the trunnions 27 and 54. As shown in Figures 4 and 5, the latching rods are in parallelism with their flat side faces 60 and 61 facing in the same direction.

As best shown in Figures 10 and 11, the forward end of the latching rod 58 is inserted through the aperture 29 of the trunnion 27 and is provided with a groove 62 extending in a circumferential direction about its round portion. A suitable vertical groove is provided at one edge of the transversely extending opening 29 in the trunnion 27 to receive a pin 63 which seats within the groove 62 to permit rotation of the latching rod 38 and at the same time restrain it against endwise movement.

A row of ratchet teeth 64, each having a square face 65 and a cam surface 66 sloping upwardly away therefrom, is provided longitudinally of the latching rod 58 and terminates at points spaced from its ends.

A similar row of teeth 67, each having a square face 68 and an upwardly sloping cam surface 69, is formed on the adjacent latching rod 59.

The forward end of the latching rod 59 extends through the U-shaped strap 30 and the box-like bracket 22 into a handle 70 to which it is connected by means of a rivet 71. At its other end, the latching rod 59 is provided with a pin 72 extending beyond the side surfaces thereof and normally abutting the flat surface 55 of the trunnion 54.

As best shown in Figures 4, 5 and 10, a loop-shaped wire spring 73 serves as a pawl for operatively connecting the trunnion 54 and the latching rod 59. In plan view, the spring pawl 73 is of U-shape with its looped end portion 74 arranged to seat within a tooth 67 of the latching rod 59 by engaging the square face 68 of its seated tooth. As viewed from the side (Figure 10), the spring pawl is partially coiled around the trunnion 54 with its free end 75 inturned to seat within shallow holes provided in the trunnion.

A similar loop-shaped wire spring pawl 76 engages the latching rod 58 by its looped end 76a and its inturned ends 76b seated within suitable openings also provided in the trunnion 54. Both spring pawls serve further to restrain the latching rods against movement in a sidewise direction relative to the trunnion.

At their forward ends, the latching rods 58 and 59 are provided with identical short levers 77 and 78. At its wide end, each lever is provided with a D-shaped aperture for embracing its respective latching rod for the purpose of permitting relative endwise movement therebetween and effecting rotation as the lever is swung from one side to the other. The levers are pivotally connected at their upper ends to a link 79 by means of rivets 80 and 81. As best shown in Figure 11, the levers 77 and 78 are positioned between the flat face 27a of the trunnion 27 and the web 33 of the U-shaped strap 30.

A wire spring 82 is coiled around the forward end of the latching rod 58 with one end 83 having hooked engagement with the web 25 of the box-like bracket 22 and its other end 84 having hooked engagement with the lever 78. When so connected, the spring 82 serves to normally hold the extended end portion 79a against the side wall 23 of the bracket 22 (Figure 6). When the handle 70 is rotated in a counter-clockwise direction, the pivotally connected levers 77 and 78 swing to the left, as shown in Figure 7, into abutment with the leg 31 of the U-shaped strap to limit its movement in that direction. It is to be noted that rotation of the handle 70 serves to jointly rotate both latching rods 58 and 59 by reason of their connection through the levers 77 and 78. When so rotated, the rows of teeth 64 and 67 are rotated away from the zone of influence covered by the looped ends of the pawls 73 and 76, as diagrammatically illustrated in Figures 8 and 9. When in the position shown in Figure 9, the looped ends 74 and 76a of the pawls engage a smooth surface of their respective latching rods adjacent the rows of teeth thereby permitting the pawls to inoperatively engage their respective latching rods.

The operation of the mechanism will now be explained.

When the parts are positioned as shown in Figures 1 and 4, the brake lever construction described herein is in a fully brake-released position.

To actuate the brakes to a "set" position, the operator merely grasps the handle 70 and pulls it toward him or in a direction to the right as shown in Figure 1. During movement of the movable latching rod 59 in this direction, engagement between the pin 72 thereon and the trunnion 54 moves the latter along the endwise stationary latching rod 58. The looped end of the spring pawl 76 ratchets or slides along the sloping surfaces of the ratchet teeth 64. As soon as pulling effort on the handle 70 is released, tension of the brake-actuating mechanism as exerted through the brake rod 43 tends to pull the swinging lever 34 to the left. This tendency is overcome by engagement of the looped end 76a of the spring pawl 76 against a square face 65 of one of the ratchet teeth 64 provided on the latching rod 58. This engagement serves to hold the trunnion 54 in the position to which it is moved by the movable latching rod 59.

As shown in Figure 5, the swinging lever 34 may be swung from a fully brake-released position (full lines of Figure 1) to a fully brake-actuated position (dotted lines of Figure 1) by one complete endwise movement of the latching rod 59. Actuation from one braking position to the other may also be effected by a series of partial endwise movements of the endwise movable latching rod 59. It is to be noted that the latching rod 59 is free for movement to the left without affecting the adjusted position of the trunnion 54 and the swinging lever 34 which are held in that position by engagement between the loop 76a of the spring pawl and a square face of one of the ratchet teeth 54. This pumping by successive strokes of the movable latching rod 59 serves to progressively set the brakes.

As shown in dotted lines of Figure 1, a slight pivoting action takes place at both trunnions due to the difference in the angularity between their centers when moved between the swinging limits of the lever 34. As shown in Figure 10, this vertical angular movement of the endwise movable latching rod 59 is provided for by a vertically extending opening 85 in the wall 25 of the box-like bracket 22.

To release the brake lever mechanism, the operator rotates the handle 70 in a counter-clockwise direction to jointly rotate the latching rods 58 and 59 to a position in which the rows of latching teeth are no longer in a zone of engagement with the looped ends of the spring pawls. Brake tension as exerted through the brake rod 43 then pulls the swingable lever 34 to the left or in a fully brake-released position. If it is found that the brake tension is insufficient to so move the swingable lever, a spring arrangement (not shown) may be provided therewith to pull the lever to the left or to a brake-released position, as shown in Figure 1. To prevent snapping of the swingable lever from a fully brake actuated position to a fully brake-released position by such a spring arrangement, the movable latching rod 59 should be pulled to the right to its limit of movement as shown in Figure 5 so that the operator may hold the handle to allow the spring to gradually pull the swingable lever to its fully released position.

A very important feature of the brake lever construction described herein is the ability to push the handle 70 and its connected endwise movable latching rod 59 to the same position it assumes when the brakes are fully released without affecting the adjusted position of the swinging lever 34, as shown in Figure 1. This arrangement is diagrammatically illustrated in dotted lines of Figure 5.

The brake lever construction described herein provides a swinging type of lever which is actuated by a complete movement or by partial endwise movements of a substantially straight-pull type of lever, the latter swinging the former to an adjusted position on a parallel ratchet member whereby a spring pawl engages the latter to hold the swinging lever in its adjusted position. Release is provided by jointly rotating the straight-pull lever and the ratchet member to position their spring pawls in inoperative engaging positions.

While a particular embodiment only of this invention has been illustrated, it will, of course, be understood that the invention should not be limited thereto, since many modifications may be made, and it is therefore contemplated by the appended claims to cover all such modifications as fall within the true spirit and scope of the present invention.

I claim as my invention:

1. A brake actuating mechanism comprising a stationary support, a brake actuating member pivotally mounted on said support, a second member carried by and arranged for substantially longitudinally sliding movement through said support, said second member having means thereon for engaging said first member to move said first member to a brake applying position, and latching means independent of said second member for holding said first member in a desired brake applying position, whereby said second member may be returned to its original position without releasing said first member from its brake applying position.

2. A brake actuating mechanism comprising a support, a brake actuating member pivotally mounted on said support, a second member carried by said support and arranged for substantially longitudinal sliding movement and rotational movement about its own axis relative to said support, said second member having means thereon for engaging said first member to move said first member to a brake applying position, latching means independent of said second member for holding said first member in a desired brake applying position, whereby said second member may be returned to its original position without releasing said first member from its brake applying position, and latch releasing means operable by rotational movement of said second member about its own axis for releasing said first member from its latched engagement with said latching means, whereby said first member may be returned to its original position.

3. A brake actuating mechanism comprising a swingable member adapted for connection to a brake, a pull member arranged for endwise and rotational movements relative to said swingable member for swinging the latter to a brake setting position when the pull member is moved in one endwise direction, means for latching the first member in an adjusted position to which it is moved, and a latching connection between said members operable of its own accord during endwise movement of the pull member whereby they move as a unit when the pull member is moved in one direction and disengage for relative movement when the pull member is moved in the other direction.

4. A lever construction comprising a first member arranged to swing for actuating and releasing a brake mechanism, a second member operable by substantial endwise movements, and a latching mechanism between said members operable of its own accord during endwise movements of said second member for holding said first member in adjusted swung position, said latching mechanism being arranged to connect said members together at any desired point along the length of said second member and to disconnect said members for free relative movement.

5. A brake lever construction comprising a lever arranged for pivotal connection to a support to swing, an endwise movable actuating member operatively connected to said lever and supported by the same support, said actuating member being arranged with respect to said lever for swinging the latter when moved in one endwise direction and for free movement relative thereto when moved in the opposite direction, a latching rod in co-supported relation with said actuating member, said latching rod being arranged for limited rotational movement, and separate clutching means straddling said actuating member and ratchet rod, said clutching means for said ratchet rod being arranged to hold said lever in adjusted swung position.

6. A lever construction comprising a support, a lever member pivotally connected to one end of said support to swing, a pair of ratchet rods supported at the other end of said support and at an end of said lever member for limited rotative movement therewith, one of said ratchet rods being further arranged for movement in substantially an endwise direction, and separate clutching means with each ratchet rod, said clutching means with said one ratchet rod being adapted for connecting said lever member to said one ratchet rod to swing the former as the latter is moved in one endwise direction, said clutching means with the other of said ratchet rods being adapted to hold said lever member in its adjusted swung position.

7. A lever construction comprising a support, a lever member pivotally connected to one end of said support to swing, a pair of ratchet rods supported at the other end of said support and at an end of said lever member for limited rotative movement therewith, one of said ratchet rods being further arranged for movement in substantially an endwise direction, separate clutching means with each ratchet rod, said clutching means with said one ratchet rod being adapted for connecting said lever member to said one ratchet rod to swing the former as the latter is moved in one endwise direction, said clutching means with the other of said ratchet rods being adapted to hold said lever member in adjusted swung position, and means connecting said ratchet rods permitting relative endwise movement therebetween and effecting limited co-rotational movement when one of said ratchet rods is rotated, said clutching means inoperatively engaging said ratchet rods when so rotated.

8. A lever actuating mechanism comprising a member pivotally supported for movement in an endwise and a rotative direction, a second member co-supported with said first member and arranged for limited rotative movement only, means for rotating said first member, additional means connecting said members for co-rotational movement when said first member is rotated, and clutching means associated with each of said members, the clutching means associated with said second member being arranged to engage it to hold itself in adjusted position, said clutching means being rendered inoperative when said members are rotated.

9. A lever actuating mechanism comprising a ratchet member having one end formed as a handle for rotating and moving said member in an endwise direction, the other end of said member being arranged to actuate a brake as it is moved in one endwise direction, a second ratchet member arranged for limited rotative movement, a support for holding said movable ratchet members, connecting means for said ratchet members effecting co-rotation as the handle of said first mentioned ratchet member is rotated, and separate clutch means each engaging one of said ratchet members, the clutch means engaging said second ratchet member for maintaining said brake actuated position, said clutch means inoperatively engaging said ratchet members when the handle is rotated to release said brake.

10. A lever actuating mechanism comprising a toothed ratchet member, a handle at one end of said member for rotating and moving said member in an endwise direction, the other end of said member being arranged to actuate and release an associated device as the member is so moved, a second toothed ratchet member arranged for limited rotative movement, a pivotal support including an apertured member arranged to receive therethrough portions of said ratchet members, lever means connecting said ratchet members for rotating them when said handle is rotated, a second pivotal support including an apertured member arranged to receive therethrough other portions of said ratchet members, and a pair of resilient clutch members carried by said second support and each normally engaging one of said ratchet members for holding said second support in adjusted position when moved along said second ratchet member in one direction, said clutch members inoperatively engaging said ratchet members when the latter are rotated by said handle to release said second support for movement in the opposite direction.

11. A lever actuating mechanism comprising a pair of toothed ratchet rods arranged in parallelism, a handle at one end of one of said ratchet rods for rotating and moving it in an endwise direction, the other end of said ratchet rod being arranged to actuate an associated mechanism as said rod is moved in an endwise direction, the other of said ratchet rods being arranged for limited rotative movement, an apertured member arranged to receive a portion of said ratchet rods therethrough, a stationary bracket for pivotally supporting said apertured member, a lever on each of said ratchet rods being connected for jointly rotating said rods when said handle is rotated, a second pivotal support having an apertured member for receiving therethrough other portions of said ratchet rods, resilient means normally holding said levers in one angular position, and resilient clutch means carried by said second support each engaging a tooth on one of said ratchet rods when said levers are in said one angular position for holding said second support in adjusted position when moved along said other ratchet rod by said endwise movable ratchet rod, said clutch means inoperatively engaging said ratchet rods adjacent their toothed portions when they are rotated by said handle to release said second support for free movement in the opposite endwise direction along said other ratchet rod.

12. A lever actuating mechanism comprising a pair of ratchet members, a stationary member normally pivotally supporting one end of said ratchet members, one of said ratchet members being arranged for endwise movement through said support, both of said ratchet members being arranged for rotative movement in said support, connecting means for said ratchet members allowing endwise movement therebetween and effecting joint rotation when said one ratchet member is rotated, a handle at one end of said one ratchet member for moving it in an endwise direction and for jointly rotating both members, a swingable member pivotally supporting said ratchet members in spaced relation from said stationary support, both of said ratchet members being arranged for rotative movement relative to said movable support, said one ratchet member being arranged for endwise movement relative to said movable support for moving the latter along the other of said ratchet members, and a resilient pawl for each ratchet member, said pawls being carried by said movable support and arranged to normally engage their respective ratchet members for holding said movable support in adjusted position when so moved, said pawls inoperatively engaging their respective ratchet members when the latter are jointly rotated to permit said movable support to freely move in the opposite direction.

13. A lever actuating mechanism comprising a pair of D-shaped ratchet rods arranged in parallelism, each of said ratchet rods having a row of ratchet teeth along an edge thereof, each of said teeth having a square face and a sloping cam surface, a handle at one end of one of said ratchet rods for rotating and moving it in an endwise direction, the other of said ratchet rods being arranged for limited rotative movement, an apertured member arranged to receive said ratchet rods therethrough, a stationary U-shaped bracket pivotally supporting said apertured member, a second U-shaped member having legs seating against the inside of the legs of said U-shaped bracket and tightly embracing said apertured member to restrict endwise movement thereof, an upstanding lever for each ratchet rod having one end embracing said rod, a link pivotally connecting the opposite ends of said levers for jointly rotating said rods when said handle is rotated, spring means normally holding an end of said link against said U-shaped bracket, a second apertured member arranged for sliding movement along said other ratchet rod for actuating a brake as said one ratchet rod is moved in one endwise direction, the other end of said one ratchet rod being arranged to so move said second apertured member, a movable bracket pivotally supporting said second apertured member, and a looped-shaped spring pawl for each ratchet rod, each of said pawls being carried by said second apertured member with its loop arranged to engage a tooth on its respective ratchet rod when said link is in its normal position, the pawl engaging said other ratchet rod being arranged to hold said second apertured member in adjusted position when moved by said one ratchet rod, said pawls inoperatively engaging said ratchet rods adjacent the rows of teeth when said rods are jointly rotated by said handle for releasing said second apertured member for movement in the opposite endwise direction along said other ratchet rod, said one ratchet rod being arranged to actuate said brake by a complete endwise movement or by a series of partial endwise movements.

14. A lever construction comprising a support, a lever member pivotally connected at one end to said support to swing, an apertured trunnion member pivotally connected to the other end of said lever member, an additionally apertured trunnion member pivotally connected to the other end of said support, a pair of ratchet members supported in the apertures of said trunnions and arranged for rotative movement therein, one of said ratchet members being retained by said additional trunnion member against endwise movement, the other of said ratchet members being arranged for endwise movement in both directions relative to said additional trunnion member and for endwise movement in one direction relative to the first mentioned trunnion member, said other ratchet member when moved in the opposite direction swinging said pivoted lever member and moving said first mentioned trunnion member along said one ratchet member, a handle on one end of said movable ratchet member for so moving it, means connecting said ratchet members for jointly rotating them when said handle is rotated, and a pawl for each ratchet member normally arranged to engage it for holding said first mentioned trunnion in adjusted position when moved along said one ratchet member, said pawls inoperatively engaging said ratchet members when they are jointly rotated for releasing said first mentioned trunnion for free movement in either direction.

15. A lever construction comprising a support, a lever member of U-shaped configuration pivotally connected at one end of said support to swing, said lever member being arranged to actuate and release a brake when swung, spaced legs at the other end of said lever member, an apertured trunnion pivotally connected to said spaced legs, a U-shaped bracket connected to the other end of said support in depending relation therefrom, an additionally apertured trunnion pivotally connected to said U-shaped bracket, a U-shaped strap embracing said additional trunnion between the legs of said U-shaped bracket and arranged to restrict it against endwise movement, a pair of D-shaped ratchet rods supported in the apertures of said trunnions and arranged for rotative movement therein, each of said ratchet rods having a row of ratchet teeth along an edge thereof, each of said teeth having a square face and a sloping cam surface, means carried by one of said ratchet rods and engaging said additional trunnion for holding said ratchet rod against endwise movement, the other of said ratchet rods being arranged for endwise movement in both directions relative to said additional trunnion and for endwise movement in but one direction relative to the first mentioned trunnion, said endwise movable ratchet rod when moved in a direction opposite said one direction swinging said lever member and moving said first mentioned trunnion along said one ratchet rod, a handle on one end of said endwise movable ratchet rod for so moving it, a lever having a D-shaped aperture for each ratchet rod, said levers embracing said ratchet rods, a link pivotally connecting said levers for jointly rotating said ratchet rods when said handle is rotated, spring means normally holding said levers in one angular position, and a looped-shaped spring pawl for each ratchet rod, each of said pawls being carried by said first mentioned trunnion with its loop arranged to engage the square face of a tooth on its respective ratchet rod when said levers are in said normal angular position for holding said swingable lever in adjusted position when so moved, each of said pawls ratcheting over said teeth when relative movement between it and the square faces of the teeth are away from each other, said pawls inoperatively engaging said ratchet rods adjacent the rows of said teeth when said rods are jointly rotated by said handle for releasing said swingable member for movement in either swinging direction, said endwise movable ratchet rods being arranged to actuate a brake by a complete endwise movement or by partial endwise movements.

16. A lever actuating mechanism comprising a support member, apertures through said support member, rods of non-circular cross-section slidably and rotatably extending through said apertures, levers having complemental openings therein for slidably embracing said rods adjacent said support member, and a link connecting said levers for co-rotating said rods when either of said rods is rotated.

17. An actuating mechanism for a brake lever construction comprising a pair of members supported in spaced parallel relation, means connecting said members for co-rotation about their respective longitudinal axes, one of said members being movable in endwise directions relative to the other of said members, mechanism movable by said one member for actuating and releasing brakes, and means for holding said mechanism in an adjusted position to which it is moved and for releasing said mechanism when said members are co-rotated.

18. An actuating mechanism for a brake lever construction comprising a pair of elongated ratchet members, spaced supports common to both ratchet members, one of said supports being movable toward and away from the other of said supports, means connecting said ratchet members for co-rotation about their respective longitudinal axes, one of said ratchet members being movable relative to the other ratchet member for moving said one support relative to the other support, pawl means with each ratchet member and said one support for holding said one ratchet member against movement relative to the one support in one direction and for holding said one support in adjusted positions to which it is moved, and means for rotating said ratchet members for disconnecting said pawl means and ratchet members.

ARTHUR P. FERGUESON.